April 21, 1931.  G. SCHWARZ  1,801,784
METHOD OF AND APPARATUS FOR PRODUCING PHOTOGRAPHIC SILVER SALT EMULSIONS
Filed Dec. 4, 1929
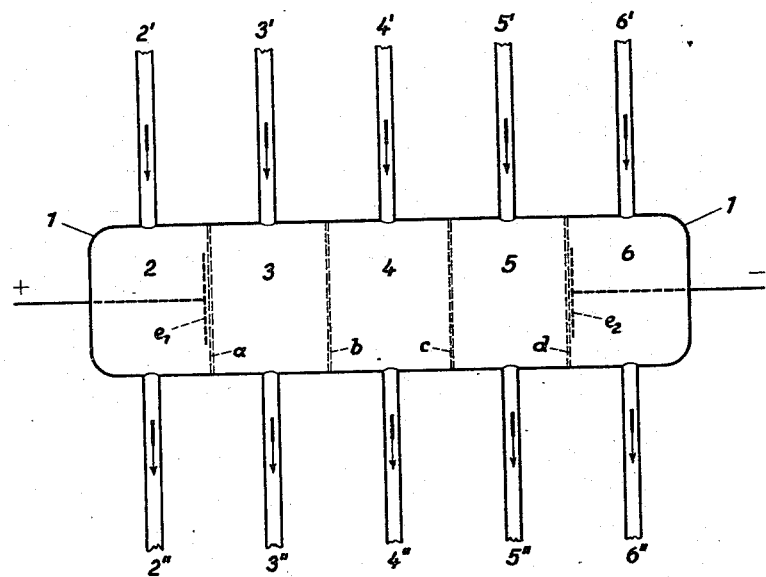
Inventor:
Georg Schwarz
by Kundhatin
Atty.

Patented Apr. 21, 1931

1,801,784

UNITED STATES PATENT OFFICE

GEORG SCHWARZ, OF VIENNA, AUSTRIA

METHOD OF AND APPARATUS FOR PRODUCING PHOTOGRAPHIC SILVER-SALT EMULSIONS

Application filed December 4, 1929, Serial No. 411,593, and in Austria August 11, 1928.

My invention refers to a method of and apparatus for producing photographic silver-salt emulsions.

It is an object of my invention to obtain the silver-salt emulsion immediately in pure condition so that it can be used without further treatment to simplify the method of producing emulsions of the kind described, and to reduce its cost.

The method of producing photographic silver-salt emulsions is based on the reaction:

$$AgNO_3 + KBr = AgBr + KNO_3.$$

Obviously instead of potassium bromide other halogen compounds may be used. The silver-bromide is embedded in the gelatine which is pressed into the shape of wires or vermicelli and washed in order to remove the undesirable but inevitable potassium nitrate. This treatment of the emulsion by pressing and washing is not required in my invention as I obtain the emulsion in pure condition.

It is another object of my invention to provide operating conditions which are well-established from the point of view of colloid chemistry so that my method and apparatus will supply products of the same properties as often as the operation is repeated. In the methods as performed heretofore the properties of the product obtained were uncertain.

With these objects in view, I so perform my method and so design my apparatus that a solution of a protective colloid, such as gelatine, is disposed in a space between an anode space containing a body of a silver-compound solution, and a cathode space containing a solution of a body of a halogen compound. The protective colloid is separated from the anode and cathode spaces by diaphragms and the bodies are subjected to electrolytic action.

An apparatus in which my invention may be performed is in its simplest form designed as a three-cell apparatus with diaphragms between the three cells. The protective colloid is placed in the middle cell and the bodies are placed in the end cells. Electric current is then applied and causes the silver ions and the halogen ions which are intended to combine with the silver ions, to travel into the middle cell. The apparatus employed is similar to the three-cell apparatus for electro-dialysis but while in electro-dialysis ions are removed from the middle cell by direct current, I operate the apparatus so as to convey the silver ions and the halogen ions into the middle cell also, by direct current.

In performing my method the middle cell of the apparatus which may be designed as a thermostat, and is separated from the anode and cathode spaces by diaphragms at both its ends, is filled with a watery solution of a protective colloid, for instance, a 10 per cent gelatine solution. The anode space contains the body of silver-salt solution, for instance, a solution of silver nitrate, and the cathode space contains a solution of a salt the anions of which are intended to combine with the silver-ions, for instance a salt of chlorine bromine, iodine or the like, dissolved in water, or a mixture of such salts.

The diaphragms are made of the materials usually employed in colloid chemistry, for instance, collodium, chromate gelatine, parchment paper, and the like.

When direct current is applied to flow from the anode space to the cathode space silver ions travel from the anode space into the middle cell and salt anions travel into the middle cell from the cathode space, where they combine into the desired silver halide. At the end of the process the anode space contains the anions and the cathode space contains the cations of the salts used in the respective spaces, as these ions cannot travel against the current. Obviously the hydrogen ions and hydroxyl ions also travel, causing alkaline reaction in the cathode space and acid reaction in the anode space, while in the middle cell a pure emulsion of silver halide and gelatine is obtained which does not require any further treatment as in the old methods.

My method may be performed in various ways and the following example is given without limiting my invention thereto:

The middle cell is charged with 500 cubic centimetres of a watery 10 per-cent-solution of gelatine and the anode and cathode spaces are charged with a solution of 30 grammes of silver nitrate dissolved in about 800 cubic centimetres of water, and with a solution of 25 grammes of potassium chloride in about 800 cubic centimetres of water, respectively. Direct current the voltage of which may be 220, is now applied and after about 1½ hours the formation of silver chloride gelatine is completed in the middle cell.

In a three-cell apparatus acid forms in the anode space, and lye in the cathode space, nitric acid and caustic potash solution, in the above example, respectively. The concentration of the acid and the lye increases gradually to such a concentration that the two agents corrode the diaphragms. Corrosion of the diaphragms causes several drawbacks and, first and foremost, prevents continuous operation by adding further quantities of silver salt and of halogen salt, as the concentration would be increased infinitely.

I eliminate this drawback by not only keeping away from the middle cell the ions not required for obtaining the silver salt emulsions, for instance ions of nitrate, sodium, potassium, and the like, but also by causing the undesirable ions to travel from the spaces containing their salt solutions toward the electrodes which are outside the spaces, thus preventing formation of acid and lye in the chambers of the salt solutions so that the method may be performed continuously.

In the drawing affixed to this specification and forming part thereof an apparatus for continuous operation in accordance with my method is illustrated diagrammatically by way of example. The apparatus comprises a casing 1 which is subdivided into five cells 2, 3, 4, 5, and 6, by diaphragms $a$, $b$, $c$ and $d$, each cell having a supply pipe $2'$, $3'$, $4'$, $5'$, $6'$, and a discharge pipe $2''$, $3''$, $4''$, $5''$ and $6'''$, respectively. 4 is the middle cell which may be a thermostat, and is filled with a solution of the protective colloid, for instance, a watery solution of gelatine, through its supply pipe $4'$. The cells 3 and 5 at the ends of the middle cell 4, which are separated from the middle cell by diaphragms $b$ and $c$, are supplied with a solution of a silver salt, for instance silver nitrate, through the pipe $3'$, and with a solution of a halogen salt, for instance potassium bromide, through the supply pipe $5'$, respectively. The cells adjacent the outer ends of the cells 3, 5, the cell 2 containing an anode $e'$, preferably a grid, connected with the positive terminal of a direct-current system, and the cell 6 containing a cathode $e^2$, which may also be a grid, connected with the negative terminal of the system, are filled with water through their respective supply pipes $2'$ and $6'$. Direct current is now cut in and preferably the contents of the middle cell 4 are agitated by any suitable means, not shown, while in all cells of the apparatus the contents are continuously made up at the rate at which they are discharged.

In conformity with the potential drop, the positive silver ions travel from the cell 3 into the middle cell 4 through the diaphragm $b$, and at the same time the negative halogen ions travel in counter current to the potential drop from cell 5 into the middle cell 4 through the diaphragm $c$, and combine into a silver halide emulsion with the silver ions. The negatively charged nitrate ions travel in counter current to the potential drop into the cell 2 from the cell 3 through the diaphragm $a$ where they form nitric acid with the hydrogen ions of the water in the cell 3. The positively charged potassium ions travel with the current into the cell 6 from the cell 5 to the diaphragm $d$ where they form caustic potash with the hydroxyl ions of the water in the cell. The nitric acid and the caustic potash are continuously discharged from the cells 2 and 6 through the pipes $2''$, $2'''$ and $6''$, respectively, by a flow of distilled water. The solutions of silver salt and halogen salt in the cells 3 and 5, respectively, which have been diluted to such an extent as to render them inactive, are continuously discharged through the pipes $3''$ and $5''$, respectively, and made up and returned through the supply pipe $3'$, $5'$ in a continuous circulation. The finished silver-salt emulsion from the chamber 4 is removed continuously through the pipe $4''$ and is made up continuously by a supply of gelatine solution through the pipe $4'$.

In this manner, I obtain a pure silver halide gelatine emulsion in the middle cell 4 which does not require any further treatment while at the same time corrosion of the diaphragms by excessive concentration of the acids and lyes is eliminated.

It is obvious that my method may be performed in various ways, and the following example is merely given as an illustration:

Assume that the potential drop at the electrodes $e'$ and $e^2$ is 100 volt and that the current which corresponds to the pitch of the electrodes and to the pitch of the cells between the diaphragms $a$ and $d$ is 5 amperes. A n/5 solution of silver nitrate is supplied to the cell 3 and a n/5 solution of sodium chloride is supplied to the cell 5. Assume further that the middle cell 4 has a capacity of 150 cubic centimetres. Under these conditions, the silver-chloride concentration in the chamber 4 will be that required for gaslight paper within about half an hour. As soon as this concentration has been attained the finished mother emulsion is discharged through the pipe $4''$ at the rate of 300 cubic centimetres per hour while a 7 per cent gelatine solution is supplied through the pipe $4'$ at the same rate. The concentration of the solutions in the chambers 3 and 5 is made up by supplying solutions of silver nitrate and sodium chloride through the pipes 3' and 5', respectively, at the rate at which the solutions become inactive. The nitric acid and caustic soda solution which are formed in the chambers 2 and 6 are discharged by a continuous flow of distilled water at the rate of about 500 cubic centimetres per hour through the pipes 2', 2'' and 6', 6''.

In this manner the apparatus is operated continuously with a delivery of silver-salt emulsion at the rate of 300 cubic centimetres per hour which is pure and therefore does not require any subsequent purification or other treatment.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:

1. The method of producing photographic silver-salt emulsions which comprises disposing a protective colloid between an anode space containing a body of a silver-compound solution, and a cathode space containing a solution of a body of a compound the anions of which are able to combine with the silver cations from said silver-compound, separating said colloid from said spaces by diaphragms, and subjecting said bodies to electrolytic action.

2. The method of producing photographic silver-salt emulsions which comprises disposing a protective colloid between an anode space containing a body of a silver-compound solution, and a cathode space containing a solution of a body of a compound the anions of which are able to combine with the silver cations from said silver-compound, separating said colloid from said spaces by diaphragms, and subjecting said bodies to electrolytic action, so as to separate the anions of said body of silver-compound solution and the cations of said other compound from said protective colloid by the combined action of said diaphragms and of electric energy.

3. The method of producing photographic silver-salt emulsions which comprises disposing a protective colloid between an anode space containing a body of a silver-compound solution, and a cathode space containing a solution of a body of a compound the anions of which are able to combine with the silver cations from said silver-compound, separating said colloid from said spaces by diaphragms, subjecting said bodies to electrolytic action, keeping away from said protective colloid the ions not required for producing said emulsion, and discharging said ions from the respective bodies toward electrodes which are outside the spaces containing said bodies.

4. An apparatus for producing photographic silver-salt emulsions comprising a casing, diaphragms by which said casing is subdivided into a middle cell and two cells at both ends of said middle cell, an electrode in each of the two cells at the ends of said casing, and means for supplying liquids to, and discharging liquids from, said cells.

In testimony whereof I affix my signature.

GEORG SCHWARZ.